US008462924B2

(12) United States Patent
Rao

(10) Patent No.: US 8,462,924 B2
(45) Date of Patent: Jun. 11, 2013

(54) METHOD AND DEVICE FOR GENERATING PHONE BILL

(75) Inventor: Zhengguo Rao, Shenzhen (CN)

(73) Assignee: ZTE Corporation, Shenzhen, Guangdong Province (CN)

( * ) Notice: Subject to any disclaimer, the term of this patent is extended or adjusted under 35 U.S.C. 154(b) by 104 days.

(21) Appl. No.: 13/116,304

(22) Filed: May 26, 2011

(65) Prior Publication Data

US 2011/0280384 A1  Nov. 17, 2011

Related U.S. Application Data

(63) Continuation of application No. PCT/CN2009/073914, filed on Sep. 14, 2009.

(30) Foreign Application Priority Data

Nov. 28, 2008 (CN) .......................... 2008 1 0179339

(51) Int. Cl.
*H04M 15/00* (2006.01)
(52) U.S. Cl.
USPC ....... 379/119; 379/114.01; 379/124; 379/126
(58) Field of Classification Search
USPC .................. 379/111, 112.01, 112.06, 114.01, 379/114.03, 116, 119, 121.04, 121.05, 124, 379/126, 139
See application file for complete search history.

(56) References Cited

U.S. PATENT DOCUMENTS

| | | | | |
|---|---|---|---|---|
| 5,325,290 A | * | 6/1994 | Cauffman et al. | 705/34 |
| 5,333,183 A | * | 7/1994 | Herbert | 379/112.07 |
| 5,815,559 A | * | 9/1998 | Schnable | 379/114.01 |
| 5,987,107 A | * | 11/1999 | Brown | 379/114.12 |

FOREIGN PATENT DOCUMENTS

| | | | | |
|---|---|---|---|---|
| CN | 1787588 A | | | 6/2006 |
| CN | 101021801 A | | | 8/2006 |
| CN | 101022349 A | | | 8/2007 |
| CN | 101237331 A | * | | 8/2008 |
| CN | 101409877 A | | | 4/2009 |
| KR | 20040039114 A | | | 5/2004 |
| KR | 20060006148 A | | | 1/2006 |
| WO | WO 9116779 A | * | | 10/1991 |
| WO | WO 9308661 A1 | * | | 4/1993 |

OTHER PUBLICATIONS

P.R. China, State Intellectual Property Office, International Search Report for International Application No. PCT/CN2009/073914, mailed Dec. 24, 2009.

* cited by examiner

*Primary Examiner* — Binh Tieu
(74) *Attorney, Agent, or Firm* — Bright IP Law Offices

(57) ABSTRACT

The present invention discloses a method and a device for generating a phone bill, which is applied to a charging system in the communication field, wherein the method comprises a preprocessing process and a process of combining phone bills, wherein in the preprocessing process, the charging system uses multiple threads for preprocessing a plurality of service logs simultaneously, and each service log is preprocessed to generate one or more intermediate phone bills, wherein information in the service log is converted into information required for the intermediate phone bills when performing preprocessing, and a single thread is used for processing in the process of combining phone bills to generate required phone bills one by one, and during each process of generating a phone bill, the charging system collects and combines the intermediate phone bills required for generating present phone bill, accomplishes encoding record serial numbers and file serial numbers, and generates one phone bill. The present invention reduces the processing complexity while guaranteeing the processing capacity of the system.

20 Claims, 3 Drawing Sheets

METHOD AND DEVICE FOR GENERATING PHONE BILL

This is a continuation of International Application PCT/CN/2009/073914, with an International Filing Date of Sep. 14, 2009, which claims priority to Chinese Application No. 200810179339.7, filed Nov. 28, 2008, each of which is incorporated by reference.

FIELD OF THE INVENTION

The present invention relates to the technical field of communication, and more specifically to a method and a device for generating a phone bill.

BACKGROUND OF THE INVENTION

A charging system, located between a service processing node as well as a service analysis system and a charging center, is used for processing of converting and combining service logs, encoding record serial numbers and file serial numbers of the service logs, or the like, so as to generate a phone bill in a designated format and offer the same to the service analysis system and the charging center. The so-called service log records the tracks of a communication system user in a communication system, containing all the information derived from using the communication system by the user, which generally comprises information for charging and service analysis such as a user, service starting time, service ending time, etc.

As the service processing nodes are increased, requirements for the phone bill processing capability of the charging system are increasingly high. Moreover, the complexity of processing the record serial numbers and the file serial numbers of the phone bill is greatly increased.

Processing the phone bill is currently performed in a multithread parallel processing manner. The service logs are processed by each thread to generate one or more kinds of phone bill(s). All the threads use a share lock to read and write the record serial numbers and the file serial numbers of the phone bills or share to read and write output phone bills. Since the share lock is used to control, unrecoverable difficulties arise when a system is abnormal, viz. when the system is abnormal, it is difficult to recover the record serial numbers and the file serial numbers of the phone bills and to recover the output phone bills. In this case, a part of the phone bills could only be discarded to recover the system.

SUMMARY OF THE INVENTION

The technical problem to be solved of the present invention is to provide a method and a device for generating a phone bill for reducing the processing complexity while guaranteeing the processing capacity of a system.

In order to solve the above problem, the present invention provides a method for generating a phone bill, which is applied to a charging system in the communication field. The generating method comprises a preprocessing process and a process of combining phone bills, wherein, the preprocessing process comprises: the charging system using multiple threads for preprocessing a plurality of service logs simultaneously and each service log being preprocessed to generate one or more intermediate phone bills, wherein information in the service log is converted into information required for the intermediate phone bills when performing preprocessing; and the process of combining phone bills comprises: the charging system using a single thread for processing to generate desired phone bill(s) seriatim, wherein during each process of generating the phone bill(s), the charging system collects and combines the intermediate phone bills required for generating present phone bill, and accomplishes encoding of record serial numbers and file serial numbers, so as to generate the present phone bill.

In the generating method of the present invention, the steps of preprocessing each service log comprise:

marking the service log firstly, and then preprocessing the service log to generate one or more temporary intermediate phone bills associated with the service log, and then deleting the service log after accomplishing generation of the temporary intermediate phone bills, and then converting all the temporary intermediate phone bills associated with the service log into the intermediate phone bills.

Further, if existing temporary intermediate phone bills are collected after the charging system is restarted, as for each temporary intermediate phone bill, judging whether a service log associated with the temporary intermediate phone bill exist, wherein, if the service log associated with the temporary intermediate phone bill does not exist, converting the temporary intermediate phone bill into an intermediate phone bill, and if the service log associated with the temporary intermediate phone bill exists, cancelling a marker of the associated service log or maintaining the service log in an unmarked state, and after accomplishing the above processing of all the temporary intermediate phone bills, continuing to perform the preprocessing process on all unmarked service logs.

Further, the service log is associated with the temporary intermediate phone bills generated by the service Tog via their names, and the temporary intermediate phone bills are converted into the intermediate phone bills by changing their names.

Further, each process of generating the phone bill(s) comprises: the charging system firstly collecting the intermediate phone bills required for generating the present phone bill and marking the intermediate phone bills, then combining the information of the intermediate phone bills to generate one temporary phone bill, then storing current operation state information after successfully generating the temporary phone bill, then deleting the intermediate phone bills which are marked and processed completely, and finally converting the temporary phone bill into a phone bill, wherein the record serial numbers and the file serial numbers are encoded when generating the temporary phone bill or converting the temporary phone bill into the phone bill.

Further, the operation state information comprises: an identifier of a temporary phone bill generated during a process of generating the present phone bill, a record serial number and a file serial number corresponding to the present phone bill to be generated, a lastly processed intermediate phone bill, and an offset of a position where the processing of the intermediate phone bill is ended.

Further, after the charging system is restarted, firstly obtaining the operation state information stored, and then judging whether the temporary phone bill exists, wherein if the temporary phone bill exists, deleting the intermediate phone bills which are marked, except for the lastly processed intermediate phone bill recorded in the operation state information, and converting the temporary intermediate phone bills into a phone bill, entering the next process of generating a phone bill, if the temporary phone bill does not exist, cancelling markers of intermediate phone bills, except for the lastly processed intermediate phone bill recorded in the operation state information, and restarting a process of generating a phone bill with the recorded lastly processed intermediate phone bill as the first intermediate phone bill to be processed in the restarted process of generating a phone bill and with the recorded offset as the initial position where the lastly processed intermediate phone bill is processed.

Further, the step of storing the current operation state information during each process of generating a phone bill comprise: storing the current operation state information in a temporary state file firstly, and then deleting an existing state file, and converting the temporary state file into a state file by changing the name of the temporary state file.

Further, after the charging system is restarted, upon obtaining the operation state information stored, if it is determined that only the temporary state file exists in the charging system, converting the temporary state file into the state file by changing the name of the temporary state file and obtaining the operation state information stored from the state file; and if it is determined that only the state file rather than the temporary state file exists in the charging system, or the temporary state file and the state file exist simultaneously, obtaining the operation state information stored from the state file.

Further, after the charging system is restarted, if it is determined that both of the temporary state file and the state file do not exist in the charging system, adopting a default state, and setting the file serial numbers and the record serial numbers to be 1 subtracted from corresponding initial serial numbers and other contents be a null or zero as the operation state information.

Further, the multiple threads used in the preprocessing process and the single thread used in the process of combining phone bills are carried out in parallel.

The present invention also provides a device for generating a phone bill in a charging system in the communication field, which comprises at least one phone bill generating module, and the phone bill generating module comprising a preprocessing component and a combining component, wherein, the preprocessing component is configured to use multiple preprocessing threads to preprocess a plurality of service logs, wherein one or more intermediate phone bills are generated by preprocessing each service log, and information in the service log is converted into information required for the intermediate phone bills when performing preprocessing; and the combining component is configured to use a single thread to process the intermediate phone bills to generate a phone bill, during each process of generating the phone bill, collect and combine the intermediate phone bills required for generating present phone bill, and accomplish encoding of record serial numbers and file serial numbers to generate the present phone bill.

Further, the preprocessing component is further configured to, when preprocessing each service log, mark the service log firstly, and then preprocess the service log to generate one or more temporary intermediate phone bills associated with the service log, and then delete the service log after accomplishing generation of the temporary intermediate phone bills, and then convert all the temporary intermediate phone bills associated with the service log into the intermediate phone bills.

Further, the combining component is further configured to, when generating a phone bill each time, collect the intermediate phone bills required for generating the present phone bill and mark the intermediate phone bill, then combine the information of the intermediate phone bills to generate one temporary phone bill, then store current operation state information after successfully generating the temporary phone bill, then delete the intermediate phone bills which are marked and processed, and finally convert the temporary phone bill into a phone bill, wherein the record serial numbers and file serial numbers are encoded when generating the temporary phone bill or converting the temporary phone bill into the phone bill, and when storing the current operation state information, the current operation state information is firstly stored in a temporary state file, an existing state file is then deleted, and the temporary state file is converted into a state file by changing the name of the temporary state file.

Comparing with the prior art, the method of the present invention is to preprocess each service log by the charging system into a plurality of intermediate phone bills, then to filtrate and combine each type of the intermediate phone bills to generate a temporary phone bill, and then to encode the record serial number and file serial number of the temporary phone bill to form a phone bill. The preprocessing process in the method raises its speed via multiple threads, while recovering the process of combining phone bills is performed in a single thread, which can significantly reduce the complexity of encoding the record serial numbers and file serial numbers for processing the phone bill without considering a complex synchronization. On the basis of the method, a recovering method can cooperate therewith to prevent the loss and repetition of the phone bill after the system is restarted and to improve the robustness of the charging system.

DETAILED DESCRIPTION OF THE PREFERRED EMBODIMENTS

The preferred embodiments are described in detail hereinafter without unduly limiting the present invention.

Figure 1:
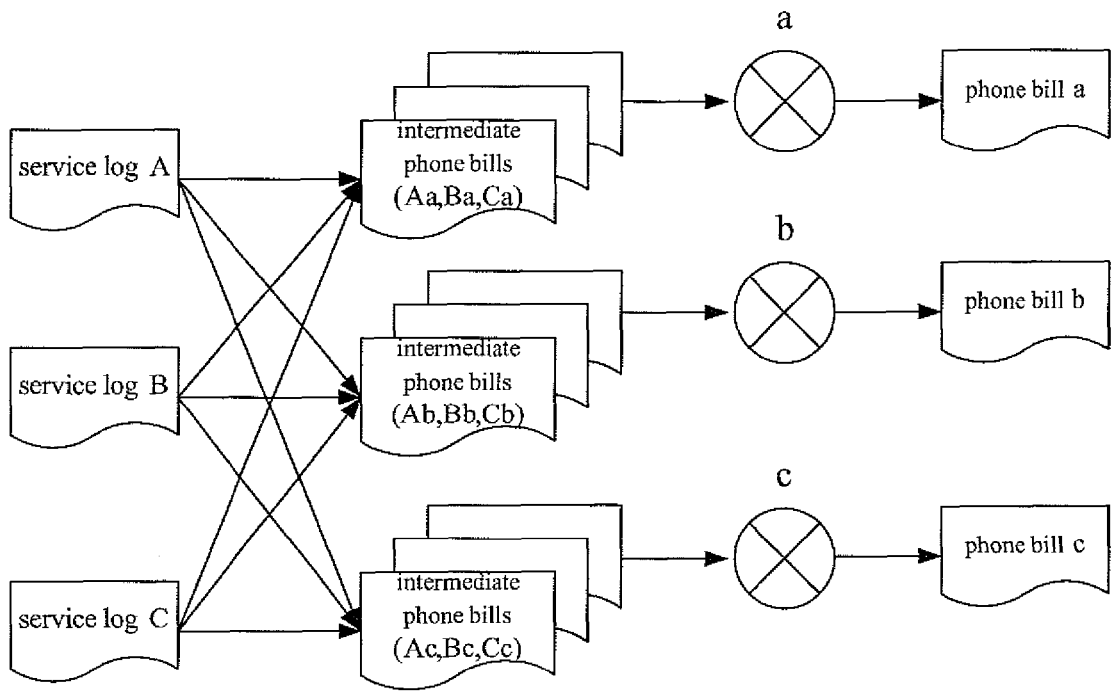
FIG. 1 is a schematic diagram of processing in the sequence of a service log, intermediate phone bills, and a phone bill according to an embodiment of the present invention.

The flow of a processing method of a charging phone bill according to an embodiment of the present invention comprises a preprocessing process and a process of combining phone bills. In the preprocessing process, multiple threads which are parallel are provided to process a plurality of service logs simultaneously, and each service log is preprocessed to generate one or more intermediate phone bills. In the process of combining phone bills, a single thread is used to combine the intermediate phone bills obtained from preprocessing, and encoding of record serial numbers and file serial numbers of the phone bill is accomplished to generate a phone bill required by a client. The schematic diagram thereof is as shown in FIG. 1. It shall be particularly mentioned that the single thread used in the process of combining phone bills and the plurality of threads used in the preprocessing process may be carried out in parallel, viz. the preprocessing process and the process of combing phone bills may be performed simultaneously.

Figure 2:
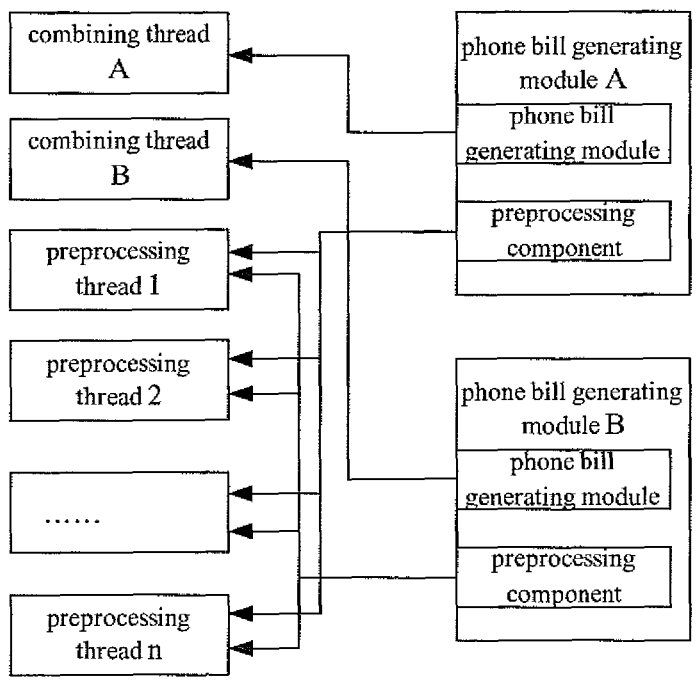
FIG. 2 is a schematic diagram of a structure of a charging system according to an embodiment of the present invention.

A structure of corresponding charging system is as shown in FIG. 2, comprising a plurality of phone bill generating modules such as a phone bill generating module A and a phone bill generating module B. The phone bill generating module A and the phone bill generating module B both comprise one combining component and one preprocessing component. The combining component of the phone bill generating module A uses a combining thread A to process intermediate phone bills so as to generate a phone bill. The combining component of the phone bill generating module B uses a combining thread B to process intermediate phone bills so as to generate a phone bill. Both the preprocessing components of the phone bill generating modules A and B use preprocessing threads 1 to n to preprocess a service log to generate intermediate phone bills.

In the preprocessing process, the charging system uses multiple threads to preprocess a plurality of service logs simultaneously. When preprocessing each service log, the service log is firstly marked (indicating the start of preprocessing the service log), the service log is then preprocessed to generate one or more temporary intermediate phone bills associated with the service log, and the service log is deleted after the preprocessing is accomplished, and then all the temporary intermediate phone bills associated with the service log are converted into intermediate phone bills. The preprocessing process is to convert information of the service log into information required for a final phone bill, wherein conversion of most of the information is accomplished in the preprocessing process, and the information in the service log can be filtrated and so on. Since the preprocessing process is achieved in multiple threads, the speed of generating the phone bill is raised.

The service log and the temporary intermediate phone bills generated by the service log can be associated with each other by names, for example, the characters except for suffixes of the two's names are the same. The temporary intermediate phone bills may be converted into intermediate phone bills by changing names, e.g. deleting specific suffixes of the names of the temporary intermediate phone bills.

Figure 3:
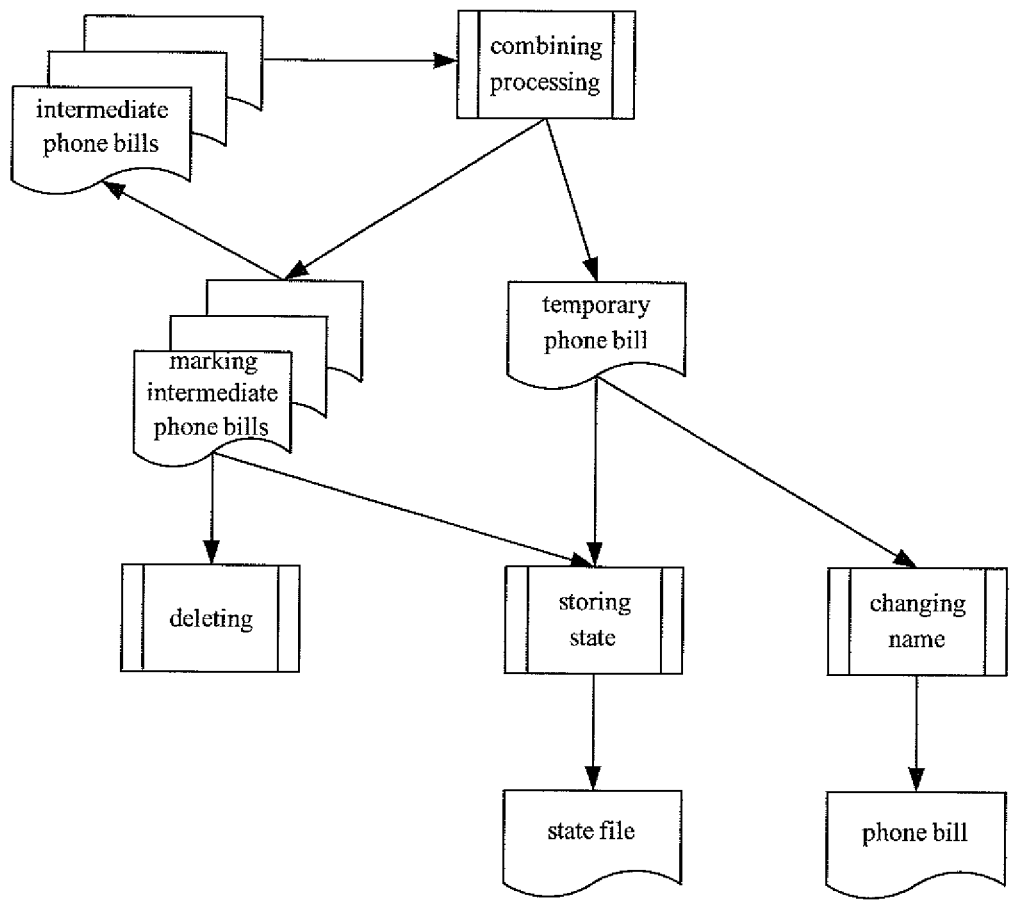
FIG. 3 is a schematic diagram of a process of combining phone bills according to an embodiment of the present invention.

The process of combining phone bills is performed in a single thread to generate required phone bills one by one. Referring to FIG. 3, in each process of generating a phone bill, the charging system firstly collects and marks required intermediate phone bills (the marker indicates the start of the processing), and combines the information in the intermediate phone bills to generate a temporary phone bill, and stores the current operation state information after successful generation, and then deletes the intermediate phone bills which are marked and processed completely, and finally converts the temporary phone bill into a phone bill by changing names such as changing the suffix of the name, wherein encoding a record serial number and a file serial number may be either performed when generating the temporary phone bill or performed when converting the temporary phone bill into the phone bill. After generating one phone bill, the charging system continues to process the next phone bill. Since the process is performed in a single thread, the complexity of encoding serial numbers is reduced.

The operation state information stored comprises information of an identifier of a temporary phone bill generated during the process of generating the present phone bill, a record serial number and a file serial number corresponding to the phone bill, a lastly processed intermediate phone bill, an offset of a position where the processing of the intermediate phone bill is ended, and the like. The information of one intermediate phone bill may be combined into two different phone bills.

When storing the current operation state information, the following method is used in the present embodiment considering that the state file is possibly destroyed. Firstly the current operation state information is stored in a temporary state file, and then the existing state file (containing the previously stored operation state information) is deleted, and then the temporary state file is renamed as a state file. In addition, a few of conversion processes are performed during the process of combining phone bills.

If the charging system has a failure during the preprocessing process, the charging system, after being restarted, recovers the preprocessing process based on the following steps.

After the charging system is restarted, the existing temporary intermediate phone bills are collected, and each temporary intermediate phone bill is processed as follows. Whether a service log associated with the temporary intermediate phone bill exists is determined, wherein if it does not exist, the temporary intermediate phone bill is renamed as an intermediate phone bill; if it exists, the marker associated with the service log is cancelled or the service log is maintained in an unmarked state, and after accomplishing processing all the temporary intermediate phone bills, the service logs which are unmarked are continued to preprocess.

The above method can prevent the phenomena of the loss and repetition of the phone bill after the preprocessing process being restarted when it has a failure.

Figure 4:
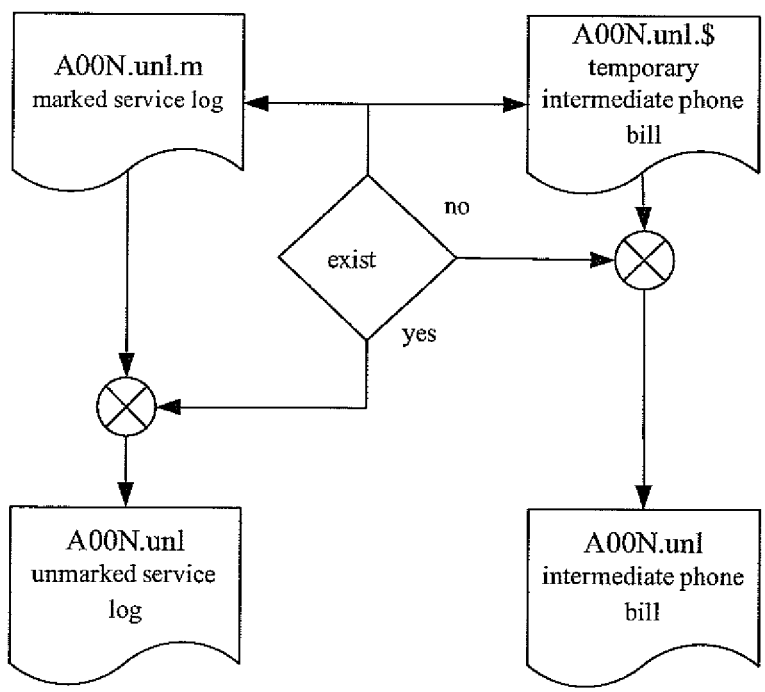
FIG. 4 is a schematic diagram of processing of one example of recovering a preprocessing process according to an embodiment of the present invention.

FIG. 4 shows a processing logic of an example of the above process of recovering preprocess. Assuming that the charging system is restarted and a temporary intermediate phone bill A00N.unl.

exists, judgment is made as for whether the service log A00N.unl.m associated therewith exists; wherein if it exists, the marker (viz. the suffix ".m" of the name) of the service log is cancelled to be A00N.unl, viz. the service log is subsequently reprocessed; if the service log A00N.unl.m does not exist, the temporary intermediate phone bill A00N.unl. is renamed as the intermediate phone bill A00N.unl.

If the charging system has a failure during the process of combining phone bills, the charging system, after being restarted, recovers the combining process based on the following steps.

Firstly the operation state information stored in the charging system is obtained, if only a temporary state file exists, the temporary state file is renamed as a state file and the operation state information therefrom is obtained; if only the state file rather than the temporary state file exists or the temporary state file and the state file exist simultaneously, the operation state information is obtained from the state file and the temporary state file which possibly exists is discarded; and if the temporary state file and the state file do not exist, the system operates for the first time and a default state is adopted.

Figure 5:
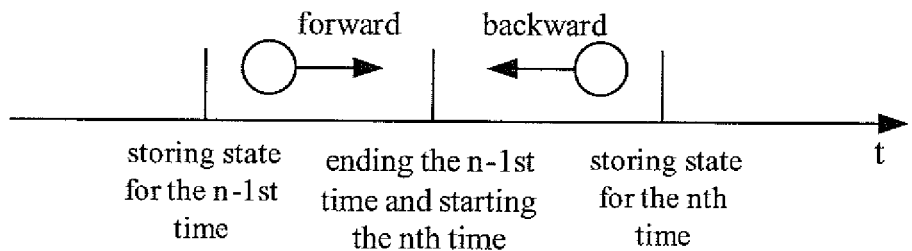
FIG. 5 is a schematic diagram of a principle of recovering a process of combining phone bills according to an embodiment of the present invention.

Then, the system state can be determined according to whether the temporary phone bill exists in the charging system. Referring to the principle as shown in FIG. 5, if the temporary phone bill exists, it is indicated that the current operation state (combining has been accomplished) is stored in the ongoing phone bill processing process (taking the n-1st time for example in the figure) when the failure takes place, however, the temporary phone bill is not converted into a phone bill, at this time, it forwards to accomplish the present phone bill processing, while if the temporary phone bill do not exist, it is indicated that the ongoing phone bill processing process has began but the current operation state is not stored when the failure takes place, viz. the combining is not accomplished and it is during a process of processing the next phone bill of the phone bill generating process recording the operation state information (taking the n-1st time for example in the figure), and at this time, it shall return to the start state of the process of processing the phone bill for the nth time.

The specific processing process is as follows.

If the temporary phone bill exists, it is indicated that the marked intermediate phone bills, except for the lastly processed intermediate phone bill recorded in the operation state information, are the present processed intermediate phone bills. At this time, the intermediate phone bills are deleted, and the temporary phone bill is converted into a phone bill to enter a process of generating the next phone bill.

If the temporary phone bill does not exist, at least one of the marked intermediate phone bills existed in the charging system can not be determined as for whether it has been processed completely, at this time, the markers of intermediate phone bills except the lastly processed intermediate phone bill recorded in the operation state information are cancelled, and a process of generating a phone bill is restarted with the lastly processed intermediate phone bill as the first intermediate phone bill to be processed in the present phone bill generating process and with the offset as the initial position where the lastly processed intermediate phone bill is processed.

The above method can prevent the phenomena of the loss and repetition of the phone bill after the combining process being restarted when it has a failure.

Figure 6:
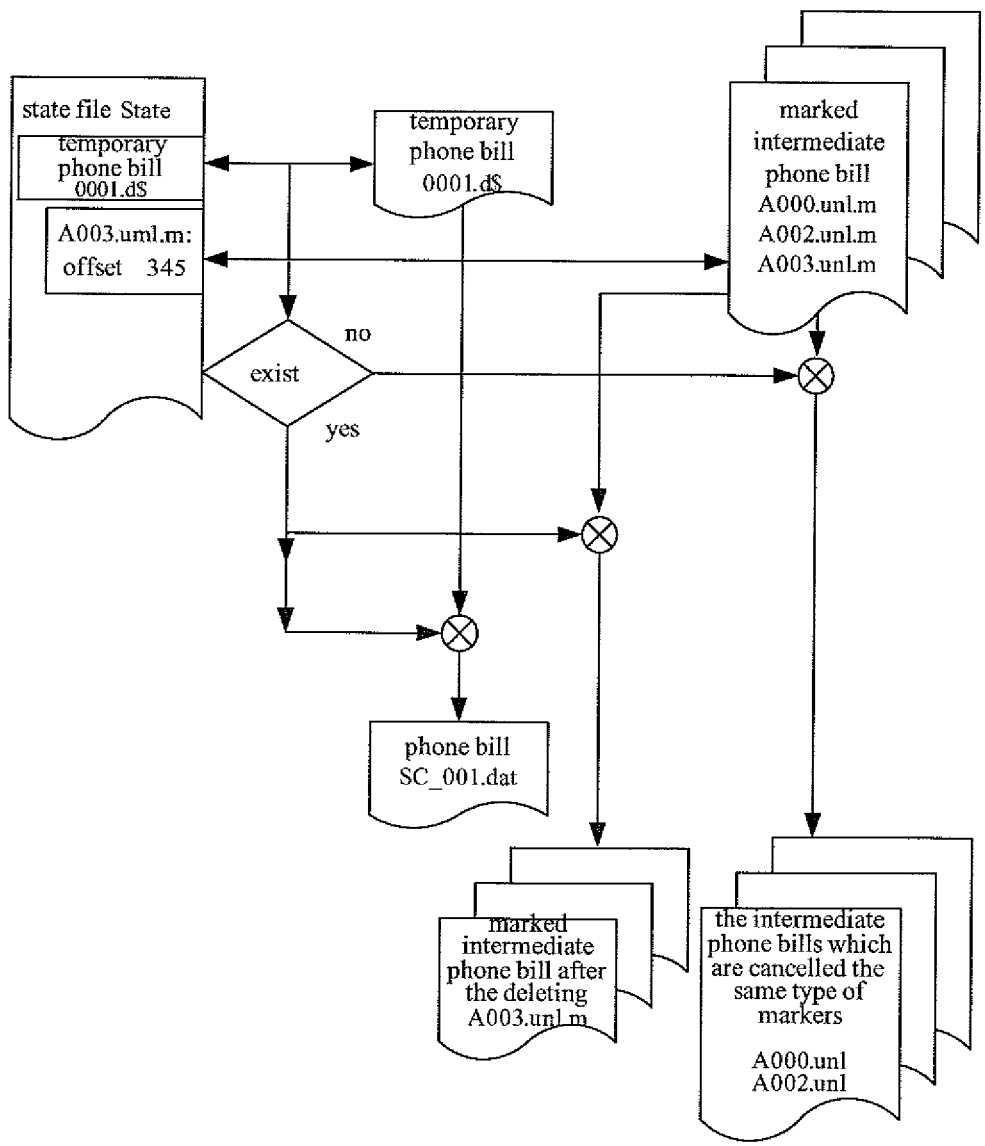
FIG. 6 is a schematic diagram of processing of one example of recovering a process of combining phone bills according to an embodiment of the present invention.

FIG. 6 shows a processing logic of an example during the recovering process of combining phone bills. After the charging system is restarted to cope with failure, it is firstly detected whether the temporary state file State. and the state file State exist, wherein if only the temporary state file State. exists, State. is renamed as a state file State and the operation state information recorded therein is obtained therefrom; if the temporary state file State. and the state file State exist simultaneously or only the state file State exists, the operation state information recorded in the current state file State is obtained; particularly, if the two do not exist, a default state is adopted, for example, the file serial number and the record serial number are set to the corresponding initial serial numbers subtracted 1, and other contents take a null or zero.

After recovering the state file State, the following processes are made according to the contents of the state file State.

If the temporary phone bill 0001.d which is recorded in the state file exists, the intermediate phone bills A000.unl and A002.unl which are marked and processed completely are deleted according to the intermediate phone bill A003.unl.m which is marked and is the lastly processed intermediate phone bill recorded in the state file, and the temporary phone bill 0001.d is renamed as phone bill SC_001.dat, and the process of generating the next phone bill is continued.

If the temporary phone bill 0001.d does not exist, the markers of the intermediate phone bills A000.unl and A002.unl, which have already been marked and can not be determined as for whether they have been processed completely, are cancelled according to the intermediate phone bill A003.unl.m which is marked and is the lastly processed intermediate phone bill recorded in the state file, and the process of generating the present phone bill is re-performed with that A003.unl.m is as the first intermediate phone bill to be processed and an initial offset is as 345.

Of course, many other embodiments are provided for the present invention. The person skilled in the art could make various corresponding variation and modification of the present invention without departing from the spirit and essence of the present invention, however, the corresponding variation and modification fall within the scope of protection of the claims attached in the present invention.

For example, only multiple threads are used for a converting process during the preprocessing process, and/or only a single tread is used for combining and encoding during the process of combining phone bills, viz. the effects can be achieved of reducing the processing complexity while improving the processing capability of the system without considering the contents of recovering from the failure mentioned in the embodiments.

INDUSTRIAL PRACTICABILITY

Comparing with the prior art, the method of the present invention is to preprocess each service log by the charging system into a plurality of intermediate phone bills, and then to filtrate and combine each type of the intermediate phone bills to generate the temporary phone bill, and then to encode the record serial number and the file serial number of the temporary phone bill to form a phone bill. The preprocessing process in the method raises the speed via multiple threads, while recovering a process of combining phone bills is performed in a single thread, which can reduce effectively the complexity of encoding the record serial numbers and the file serial numbers of the phone bill without considering the complex synchronization. On the basis of the method, a recovering method can cooperate therewith to prevent the loss and repetition of the phone bill after the system is restarted and to improve the robustness of the charging system.

What is claimed is:

1. A method for generating a phone bill, applied to a charging system in the communication field, the generating, method comprising a preprocessing process and a process of combining phone bills, wherein, the preprocessing process comprises: the charging system using multiple threads for preprocessing a plurality of service logs simultaneously, and each service log being preprocessed to generate one or more intermediate phone bills, wherein information in the service log is converted into information required for the intermediate phone bills when performing preprocessing; and the process of combining phone bills comprises: the charging system using a single thread for processing to generate desired phone bill(s) seriatim, wherein during each process of generating the phone bill(s), the charging system collects and combines the intermediate phone bills required for generating present phone bill, and accomplishes encoding of record serial numbers and file serial numbers, so as to generate the present phone bill.

2. The generating method according to claim 1, wherein the step of preprocessing each service log comprises: marking the service log firstly, and then preprocessing the service log to generate one or more temporary intermediate phone bills associated with the service log, and then deleting the service log after accomplishing generation of the temporary intermediate phone bills, and then converting all the temporary intermediate phone bills associated with the service log into the intermediate phone bills.

3. The generating method according to claim 2, further comprising: if existing temporary intermediate phone bills are collected after the charging system is restarted, as for each temporary intermediate phone bill, judging whether a service log associated with the temporary intermediate phone bill exists, wherein if the service log associated with the temporary intermediate phone bill does not exist, converting the temporary intermediate phone bill into an intermediate phone bill, and if the service log associated with the temporary intermediate phone bill exists, cancelling a marker of the associated service log or maintaining the service log in an unmarked state; and after accomplishing the above processing of all the temporary intermediate phone bills, continuing to perform the preprocessing process on all unmarked service logs.

4. The generating method according to claim 2, wherein the service log is associated with the temporary intermediate phone bills generated by the service log via their names, and the temporary intermediate phone bills are converted into the intermediate phone bills by changing their names.

5. The generating method according to claim 1, wherein each process of generating the phone bill(s) comprises: the charging system firstly collecting the intermediate phone bills required for generating the present phone bill and marking the intermediate phone bills, then combining the information of the intermediate phone bills to generate one temporary phone bill, then storing current operation state information after successfully generating the temporary phone bill, then deleting the intermediate phone bills which are marked and processed completely, and finally converting the temporary phone bill into a phone bill, wherein the record serial numbers and the file serial numbers are encoded when generating the temporary phone bill or converting the temporary phone bill into the phone bill.

6. The generating method according to claim 5, wherein the operation state information comprises: an identifier of a temporary phone bill generated during a process of generating the present phone bill, a record serial number and a file serial number corresponding to the present phone bill to be generated, a lastly processed intermediate phone bill, and an offset of a position where the processing of the intermediate phone bill is ended.

7. The generating method according to claim 6, further comprising: after the charging system is restarted, firstly obtaining the operation state information stored, and then judging whether the temporary phone bill exists, wherein if the temporary phone bill exists, deleting the intermediate phone bills which are marked, except for the lastly processed intermediate phone bill recorded in the operation state information, and converting the temporary intermediate phone bills into a phone bill, entering the next process of generating a phone bill; if the temporary phone bill does not exist, cancelling markers of intermediate phone bills, except for the lastly processed intermediate phone bill recorded in the operation state information, and restarting a process of generating a phone bill with the recorded lastly processed intermediate phone bill as the first intermediate phone bill to be processed in the restarted process of generating a phone bill and with the recorded offset as the initial position where the lastly processed intermediate phone bill is processed.

8. The generating method according to claim 7, wherein the step of storing the current operation state information during each process of generating a phone bill comprises: storing the current operation state information in a temporary state file firstly, and then deleting an existing state file, and converting the temporary state file into a state file by changing the name of the temporary state file.

9. The generating method according to claim 8, further comprising: after the charging system is restarted, upon obtaining the operation state information stored, if it is determined that only the temporary state file exists in the charging system, converting the temporary state file into the state file by changing the name of the temporary state file and obtaining the operation state information stored from the state file; and if it is determined that only the state file rather than the temporary state file exists in the charging system, or the temporary state file and the state file exist simultaneously, obtaining the operation state information stored from the state file.

10. The generating method according to claim 8, further comprising: after the charging system is restarted, if it is determined that both of the temporary state file and the state file do not exist in the charging system, adopting a default state, and setting the file serial numbers and the record serial numbers to be 1 subtracted from corresponding initial serial numbers and other contents be a null or zero as the operation state information.

11. The generating method according to claim 1, wherein the multiple threads used in the preprocessing process and the single thread used in the process of combining phone bills are carried out in parallel.

12. A device for generating a phone bill in a charging system in the communication field, comprising at least one phone bill generating module, and the phone bill generating module comprising a preprocessing component and a combining component, wherein, the preprocessing component is configured to use multiple preprocessing threads to preprocess a plurality of service logs, wherein one or more intermediate phone bills are generated by preprocessing each service log, and information in the service log is converted into information required for the intermediate phone bills when performing preprocessing; and the combining component is configured to use a single thread to process the intermediate phone bills to generate a phone bill, during each process of generating the phone bill, collect and combine the intermediate phone bills required for generating present phone bill, and accomplish encoding of record serial numbers and file serial numbers to generate the present phone bill.

13. The device according to claim 12, wherein the preprocessing component is further configured to, when preprocessing each service log, mark the service log firstly, and then preprocess the service log to generate one or more temporary intermediate phone bills associated with the service log, and then delete the service log after accomplishing generation of the temporary intermediate phone bills, and then convert all the temporary intermediate phone bills associated with the service log into the intermediate phone bills.

14. The device according to claim 12, wherein the combining component is further configured to, when generating a phone bill each time, collect the intermediate phone bills required for generating the present phone bill and mark the intermediate phone bills, then combine the information of the intermediate phone bills to generate one temporary phone bill, then store current operation state information after successfully generating the temporary phone bill, then delete the intermediate phone bills which are marked and processed, and finally convert the temporary phone bill into a phone bill, wherein the record serial numbers and the file serial numbers are encoded when generating the temporary phone bill or converting the temporary phone bill into the phone bill, and when storing the current operation state information, the current operation state information is firstly stored in a temporary state file, an existing state file is then deleted, and the temporary state file is converted into a state file by changing the name of the temporary state file.

15. The generating method according to claim 3, wherein the service log is associated with the temporary intermediate phone bills generated by the service log via their names, and the temporary intermediate phone bills are converted into the intermediate phone bills by changing their names.

16. The generating method according to claim 2, wherein each process of generating the phone bill(s) comprises: the charging system firstly collecting the intermediate phone bills required for generating the present phone bill and marking the intermediate phone bills, then combining the information of the intermediate phone bills to generate one temporary phone bill, then storing current operation state information after successfully generating the temporary phone bill, then deleting the intermediate phone bills which are marked and processed completely, and finally converting the temporary phone bill into a phone bill, wherein the record serial numbers and the file serial numbers are encoded when generating the temporary phone bill or converting the temporary phone bill into the phone bill.

17. The generating method according to claim 3, wherein each process of generating the phone bill(s) comprises: the charging system firstly collecting the intermediate phone bills required for generating the present phone bill and marking the intermediate phone bills, then combining the information of the intermediate phone bills to generate one temporary phone bill, then storing current operation state information after successfully generating the temporary phone bill, then deleting the intermediate phone bills which are marked and processed completely, and finally converting the temporary phone bill into a phone bill, wherein the record serial numbers and the file serial numbers are encoded when generating the temporary phone bill or converting the temporary phone bill into the phone bill.

18. The generating method according to claim 16, wherein the operation state information comprises: an identifier of a temporary phone bill generated during a process of generating the present phone bill, a record serial number and a file serial number corresponding to the present phone bill to be generated, a lastly processed intermediate phone bill, and an offset of a position where the processing of the intermediate phone bill is ended.

19. The generating method according to claim 18, further comprising: after the charging system is restarted, firstly obtaining the operation state information stored, and then judging whether the temporary phone bill exists, wherein if the temporary phone bill exists, deleting the intermediate phone bills which are marked, except for the lastly processed intermediate phone bill recorded in the operation state information, and converting the temporary intermediate phone bills into a phone bill, entering the next process of generating a phone bill; if the temporary phone bill does not exist, cancelling markers of intermediate phone bills, except for the lastly processed intermediate phone bill recorded in the operation state information, and restarting a process of generating a phone bill with the recorded lastly processed intermediate phone bill as the first intermediate phone bill to be processed in the restarted process of generating a phone bill and with the recorded offset as the initial position where the lastly processed intermediate phone bill is processed.

20. The generating method according to claim 19, wherein the step of storing the current operation state information during each process of generating a phone bill comprises: storing the current operation state information in a temporary state file firstly, and then deleting an existing state file, and converting the temporary state file into a state file by changing the name of the temporary state file: wherein, the method further comprises: after the charging system is restarted, upon obtaining the operation state information stored, if it is determined that only the temporary state file exists in the charging system, converting the temporary state file into the state file by changing the name of the temporary state file and obtaining the operation state information stored from the state file; and if it is determined that only the state file rather than the temporary state file exists in the charging system, or the temporary state file and the state file exist simultaneously, obtaining the operation state information stored from the state file.

* * * * *